(No Model.)

M. L. RITCHIE.
TUBE.

No. 378,976. Patented Mar. 6, 1888.

Witnesses
Chas. H. Smith
J. Staib

Inventor
Matthew L. Ritchie.
per Lemuel W. Serrell
atty

UNITED STATES PATENT OFFICE.

MATTHEW L. RITCHIE, OF NEW YORK, N. Y., ASSIGNOR TO THE EAGLE TUBE COMPANY, OF SAME PLACE.

TUBE.

SPECIFICATION forming part of Letters Patent No. 378,976, dated March 6, 1888.

Application filed October 10, 1887. Serial No. 251,899. (No model.)

*To all whom it may concern:*

Be it known that I, MATTHEW L. RITCHIE, of the city and State of New York, have invented an Improvement in Closing the Ends of Iron and Steel Tubes, of which the following is a specification.

Iron and steel tubes have been made use of in radiators and in boilers, in which the open end of the tube passes into the base of the radiator or into a hole through the shell of the vertical boiler, and the other end of such tube is closed. Usually this closing operation has been performed by dies that draw in the metal and weld the same in a hollow hemispherical form. In practice, however, it is difficult to make these ends perfectly tight, because the end is frequently hammered upon severely in driving the other end of the tube into the hole that receives the same.

My present improvement is for obtaining a perfect weld of the iron or steel where the surfaces are brought together and for strengthening the end in such a manner that the blows of the hammer thereupon cannot injure the weld or produce a leak.

Figure 1:
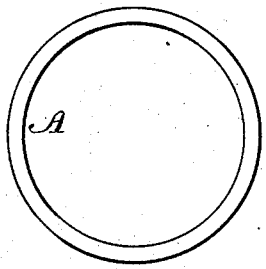
Figure 1:
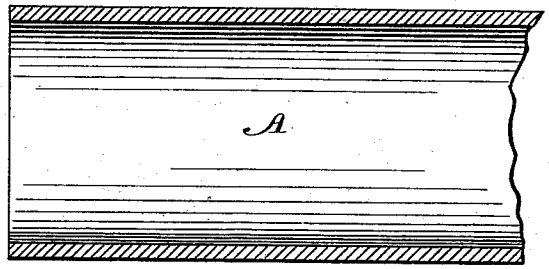
Figure 2:
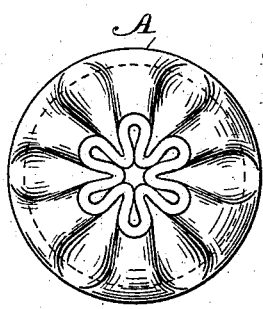
Figure 2:
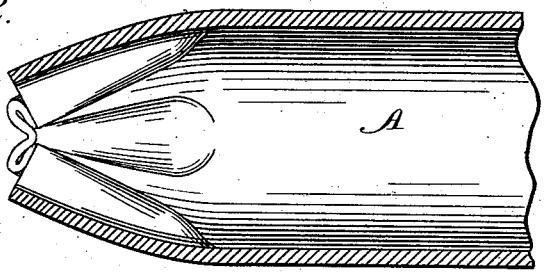
Figure 3:
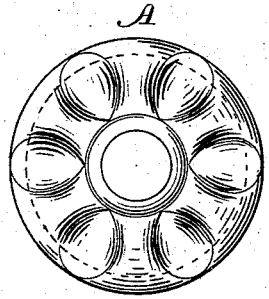
Figure 3:
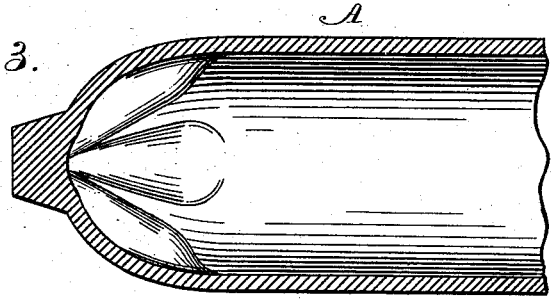
Figure 3:
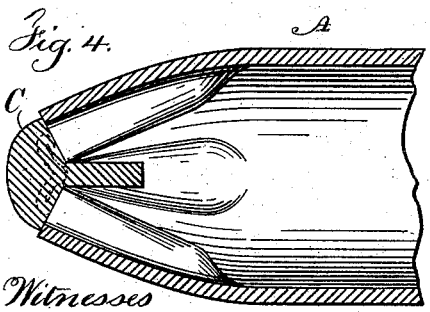
Figure 3:
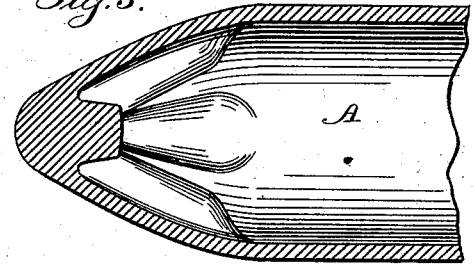

In the drawings, Figure 1 is a section and end view of the tube to be operated upon. Fig. 2 is a section and end view of the tube after the end has been corrugated conically. Fig. 3 is an end view and section of the tubes after the metal has been welded at the apex of the corrugations. Fig. 4 is a section of the end of the tube and conical corrugations with a central plug, and Fig. 5 is a section of the parts shown in Fig. 4 after the welding operation has been performed.

The iron tube A is of any desired size or thickness, and in a heated condition it is forced into a die or tool that corrugates the metal at the end into a tapering form, so that the corrugations are folded closely together, as indicated in Figs. 2 and 3, the length of the taper being sufficient to allow for the subsequent closing operations. Usually it is preferable to heat the metal to a welding heat after the conical corrugations have been formed, as seen in Fig. 2; but in some instances the corrugating and closing operation may be performed with one heating.

The closing operation consists in welding together the ends of the conical corrugations. This is done by forging down the metal into a point either by hammers or dies, and this forging and welding operation is performed either upon the corrugations of the metal itself, as shown in Fig. 2, to bring the corrugations together into a point, as indicated in Fig. 3, or there may be a plug or rivet, C, inserted at the apex of the corrugations, as seen in Fig. 4, and then the metal forged down into the shape shown in Fig. 5, so as to weld the corrugations and the plug firmly into a conical point. By this manner of closing the end of the tube the metal is thickened and strengthened at the end of the tube, and the hammering operation in driving the tube into place in the boiler or radiator takes place upon the point or apex of the conical corrugations, and cannot in any manner injure either the metal or the weld between the surfaces of the corrugations.

I do not herein claim the method specified of closing the ends of wrought-iron or steel tubes, but reserve the right to make separate application for patent for such method.

I claim as my invention—

1. The wrought-iron or steel tube, with the end closed by conical corrugations, welded together at the apex, substantially as set forth.

2. The wrought-iron or steel tube, with the end closed by conical corrugations, welded together at the apex and to an inserted plug, substantially as set forth.

Signed by me this 1st day of October, A. D. 1887.

MATTHEW L. RITCHIE.

Witnesses:
  W. J. VINCENT,
  THOS. H. McLEAN.